INVENTOR:
Alfred FISCHBACH

BY Michael J. Striker
his ATTORNEY

INVENTOR:
Alfred FISCHBACH

BY Michael J. Striker
his ATTORNEY

INVENTOR:
Alfred FISCHBACH

BY
Michael J. Striker
his ATTORNEY

INVENTOR:
Alfred FISCHBACH

BY
his ATTORNEY

United States Patent Office 3,449,795
Patented June 17, 1969

3,449,795
MOLD CLOSING MEANS FOR INJECTION MOLD MACHINE
Alfred Fischbach, Am Scheffert, Runderoth, Bezirk Cologne, Germany
Filed Aug. 24, 1966, Ser. No. 574,594
Claims priority, application Germany, Sept. 9, 1965, F 47,140; Apr. 5, 1966, F 48,861
Int. Cl. B29f 1/00
U.S. Cl. 18—30         19 Claims

ABSTRACT OF THE DISCLOSURE

An injection molding machine in which a pair of mold sections carried on platens are movable between an open and a closed position and in which a hydraulically operated clamping unit applies sealing pressure to the platens when the mold is closed.

---

The present invention relates to injection molding machines in general, and more particularly to improvements in clamping units which apply to the sections of the mold in an injection molding machine a clamping, locking and sealing pressure in the course of the actual molding operation. Still more particularly, the invention relates to improvements in clamping units which may be utilized with advantage in injection molding machines for the production of shaped articles consisting of synthetic plastic material.

In injection molding machines of the class to which the present invention pertains, a mold closing unit brings the mold sections which define the mold cavity into abutment with each other, and a clamping unit thereupon applies the pressure which is necessary to withstand stresses arising while the plastic material is being injected into the mold cavity. The application of a very strong clamping pressure is necessary to prevent flashing during injection of plasticized material. In conventional injection molding machines the clamping unit invariably comprises a separate locking device which locks the mold sections in closed positions of the mold and a separate sealing device which applies a sealing pressure to the platens supporting the mold sections, such sealing pressure being sufficient to withstand the forces arising in the course of the actual injection molding step. In many instances, the platens are locked to stationary components of the frame and the sealing device normally comprises a mechanical sealing assembly (for example, one including a spindle) or a hydraulic cylinder and piston unit which introduces a body of non-compressible fluid between a movable platen and a component of the frame. It is also known to resort to a frame which surrounds the platens and takes up the stresses during injection of plasticized material.

A serious drawback of the above outlined conventional clamping units with separate locking and sealing devices is that they comprise too many parts which occupy too much room and are prone to malfunction. Such conventional clamping units are very expensive and, if their operation is fully automatic, the injection molding machine must be provided with an expensive programming system to insure that all movements during opening and closing of the mold as well as in the course of the actual injection are carried out in a desired sequence.

It is now an important object of my invention to provide a very simple, compact and relatively inexpensive injection molding machine wherein the application of sealing pressure can be effected by resorting to a greatly simplified and reliable clamping unit of novel construction.

Another object of the invention is to provide an injection molding machine wherein the locking and sealing devices of the clamping unit form an integral assembly.

A further object of the invention is to provide an injection molding machine wherein a single prime mover suffices to effect movements of the mold closing unit and of the clamping unit so that the clamping action can begin in automatic response to closing of the mold.

An additional object of the invention is to provide novel and improved clamping units which can be readily installed in presently known injection molding machines without necessitating substantial alterations in the design of such machines.

Still another object of the invention is to provide a clamping unit which is not only capable of locking the platens of an injection molding machine against movement away from each other but is also constructed to automatically apply a requisite sealing pressure when the platens are properly locked.

A concomitant object of the invention is to provide clamping units which can either pull or push the platens into positions to seal the mold cavity in the course of the injection molding operation.

A further object of the invention is to provide a novel mold opening and closing unit which can automatically operate the clamping unit in response to closing of the mold.

Another object of my invention is to provide an injection molding machine which embodies the just outlined mold closing and opening unit.

An additional object of the invention is to provide a clamping unit whose components may be carried exclusively by the platens which support the mold sections.

Briefly stated, one feature of the present invention resides in the provision of an injection molding machine, particularly for the production of shaped articles which consist of synthetic plastic material. The machine comprises a frame, a pair of platens supported by the frame and each comprising a mold section, at least one of the platens being movable toward and away from the other platen to respectively close and open the mold which includes the mold sections, a closing unit arranged to move the one platen with reference to the other platen to respectively open and close the mold, and at least one hydraulically operated clamping unit for applying to the platens a sealing pressure when the mold is closed. The clamping unit includes a first component (for example, a rigid metallic post or tie rod) which may be carried by the one platen, and a second component (which may include a cylinder element and a piston element) cooperating with the first component and being at least indirectly connected with the other platen. For example, and if each of the two platens is movable with reference to the frame, each such platen will carry one of the two components forming a clamping unit. However, and if one of the platens is fixedly secured to the frame, the corresponding component of a clamping unit can be secured to such fixed platen or directly to the frame.

The clamping unit may be constructed in such a way that, in response to admission of a hydraulic pressure medium into the aforementioned cylinder element, the two platens are either pulled or pushed toward each other.

The novel features which are considered as characteristic of the invention are set forth in particular in the appended claims. The improved injection molding machine itself, however, both as to its construction and its mode of operation, together with additional features and advantages thereof, will be best understood upon perusal of the following detailed description of certain specific embodiments with reference to the accompanying drawings, in which:

Figure 1:
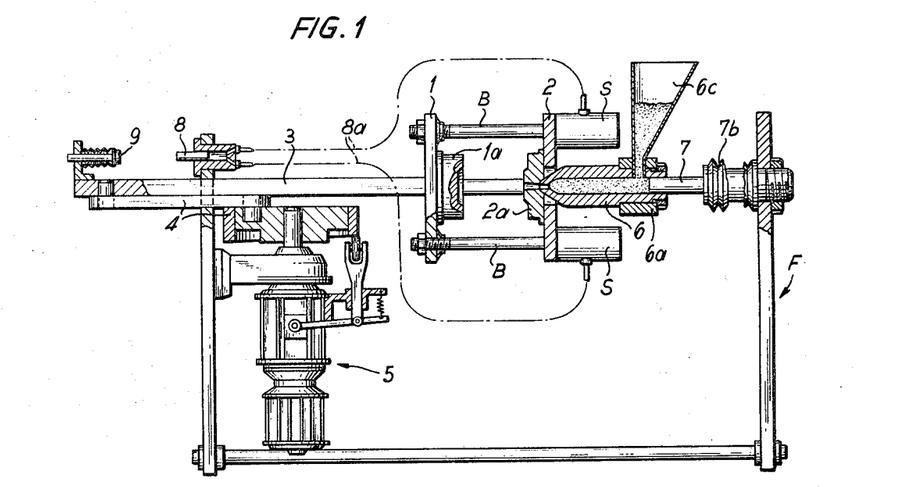
FIG. 1 is a schematic longitudinal vertical sectional view of an injection molding machine which embodies a first form of the present invention.
Figure 2:
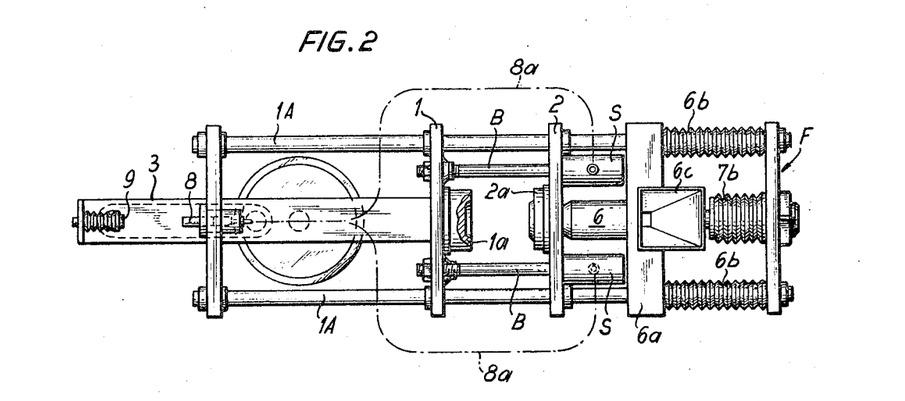
FIG. 2 is a top plan view of the injection molding machine.

Referring first to FIGS. 1 and 2, there is shown an injection molding machine comprising two platens 1, 2 which respectively comprise mold sections 1a, 2a. The platens 1, 2 are movable along tie rods 1A and the platen 1 is reciprocable by a mold closing unit including a pusher bar 3 and a crank drive 4 for the pusher bar. The crank drive 4 receives motion from a prime mover 5, preferably an electric motor.

When the motor 5 operates the crank drive 4 in a sense to move the platen 1 toward the platen 2, the mold section 1a engages and pushes the mold section 2a with the platen 2 in a direction to the right, as viewed in FIGS. 1 and 2, whereby the platen 2 abuts against and displaces a shooting cylinder 6 mounted on a crosshead 6a which is reciprocable along the tie rods 1a. The frame F which includes the tie rods 1a also carries a ram 7 which penetrates into the shooting cylinder 6 and injects plasticized material into the cavity defined by the mold sections 1a and 2a.

In accordance with the feature of the present invention, the clamping unit of the injection molding machine comprises an assembly which is operated when the mold is closed, and this assembly then applies sufficient clamping pressure to prevent separation of the mold sections 1a, 2a in the course of the actual injecting step. This clamping unit actually includes several units each of which comprises an elongated male component or post B fixedly secured to the platen 1 and a hydraulically actuated female component or gripping device S mounted on the platen 2. The exact construction of several types of co-operating male and female components will be described in connection with FIGS. 5 to 18.

The operation of the injection molding machine shown in FIGS. 1 and 2 is briefly as follows: when the motor 5 operates the crank drive 4 in a sense to move the pusher bar 3 in a direction to the right, the mold including the actions 1a, 2a is closed because the platen 1 travels along the rods 1A. Further movement of the platen 1 in response to operation of the closing unit 3, 4 will displace the shooting cylinder 6 along the tie rods 1A so that the cylinder 6 cooperates with the ram 7 and the latter injects a charge of plasticized material into the mold cavity.

Shortly before the injection of plasticized material begins, a pressurizing plunger 8 (which is reciprocally supported by the frame F) is engaged by a spring-biased motion transmitting member 9 on the pusher bar 3 whereby the plunger 8 conveys oil or another suitable liquid pressure medium through supply conduits 8a connected with the gripping devices S. These devices S comprise coupling means which then grip the respective posts B and also attract or draw the platens 1, 2 against each other to produce the desired clamping and sealing pressure. Hydraulic pressure generated by the plunger 8 can be readily selected in such a way that the clamping unit will produce sufficient clamping pressure to prevent separation of the mold sections 1a, 2a and eventual flashing of injected material when such material is being forced into the mold cavity. The clamping pressure will depend on the size of the mold and on the injection pressure. The plunger 8 will be engaged by the motion transmitting member 9 shortly before the platen 2 moves the shooting cylinder 6 to its right-hand end position. The cylinder 6 and ram 7 are respectively biased by packages of dished springs 6b, 7b. The means for admitting granular material to the shooting cylinder 6 comprises a feed hopper 6c.

Figure 3:
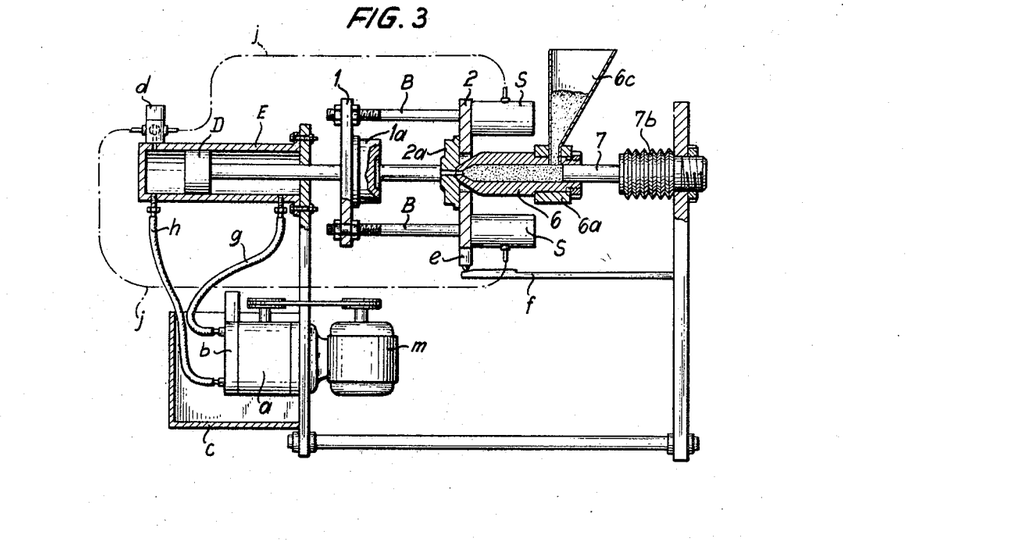
FIG. 3 is a schematic longitudinal vertical sectional view of a second injection molding machine.
Figure 4:
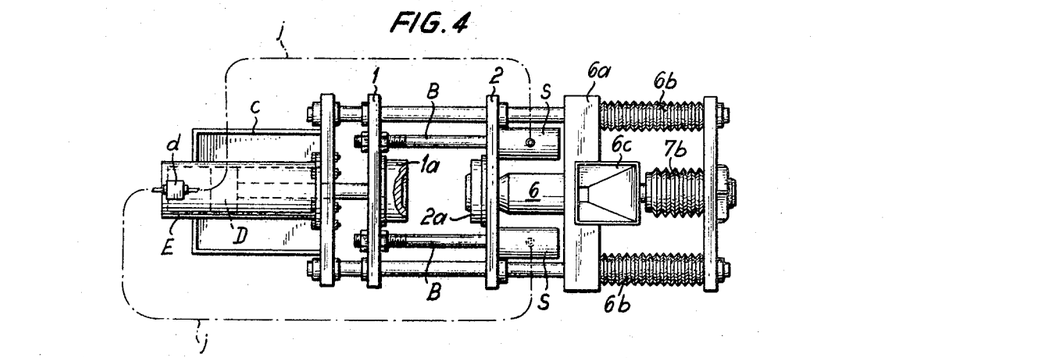
FIG. 4 is a top plan view of the second machine.

FIGS. 3 and 4 illustrate a second injection molding machine wherein the mold closing unit comprises a differential piston D reciprocal in a fixed double-acting cylinder E. The cylinder E receives oil from a hydraulic operating means including a pump $a$ driven by an electric motor $m$. The outflow of oil from the pump $a$ is regulated by an electromagnetic slide valve $b$ which can admit oil through one of two feed conduits $g$, $h$. The pump $a$ is installed in and draws liquid from an oil tank $c$.

The slide valve $b$ is controlled by suitable limit switches (not shown) which cause it to reverse the direction of oil flow through the conduits $g$, $h$ in each end position of the platen 1. Thus, when the platen 1 has been moved to its left-hand end position, the valve $b$ will admit oil through the conduit $h$ to move the differential piston D in a direction to the right. At the same time, the conduit $g$ permits return flow of oil from the cylinder E into the tank $c$. If desired, the valve $b$ may be arranged to assume a median position in which it allows oil to circulate in the pump $a$ without, however, effecting any axial displacement of the differential piston D. Movement of the valve $b$ from such median position to the one or the other end position will be triggered by a suitable timer or the like. This enables the platen 1 to dwell in one or both of its end positions.

The cylinder E carries an electromagnetic valve $d$. When the mold section 1a abuts against the mold section 2a and the latter starts to move the platen 2 toward the ram 7, an electric switch $e$ on the platen 2 engages a fixed trip $f$. The switch $e$ then completes the circuit of the valve $d$ which admits oil from the left-hand chamber of the cylinder E, through supply conduits $j$, and into the chambers of gripping devices S. A second switch (not shown) in the circuit of the valve $d$ opens when the platen 2 reaches its right-hand end position (i.e., upon completion of the injecting step) to close the valve $d$ and to allow for disengagement of gripping devices S from the respective posts B. Closing of the valve $d$ will take place shortly prior to opening of the mold.

In the embodiment of FIGS. 3 and 4, the gripping devices S receive oil from the same source (tank $c$) which also supplies oil to the pump $a$ and cylinder E. However, it is equally within the purview of the present invention to provide a separate source of pressure medium and/or a separate pump which delivers pressure medium solely to the gripping devices S. Such separate pump will force pressure medium into the gripping devices at a certain stage of an injection molding operation, for example, through one or more valves whose opening or closing is determined by suitable limit switches, timers, delay devices or analogous programming elements.

Figure 19:
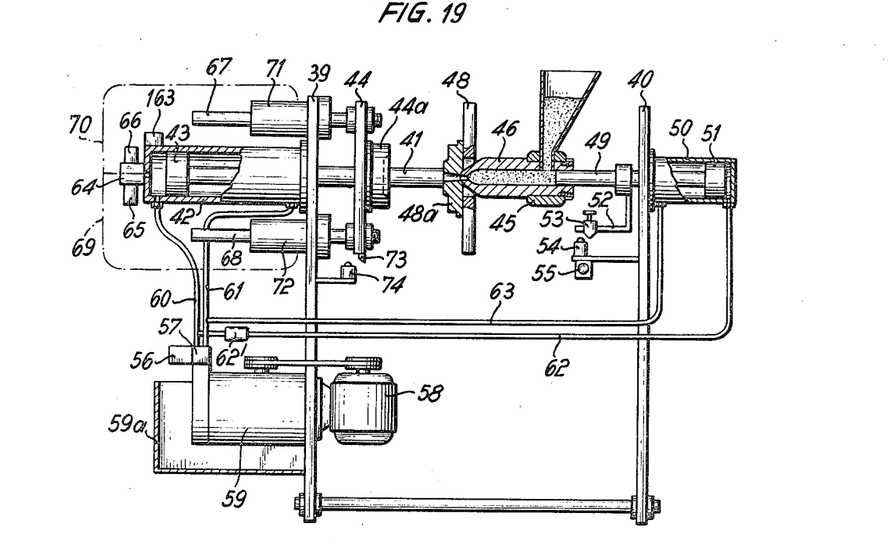
FIG. 19 is a schematic side elevational view of a third injection molding machine, with certain parts broken away.
Figure 20:
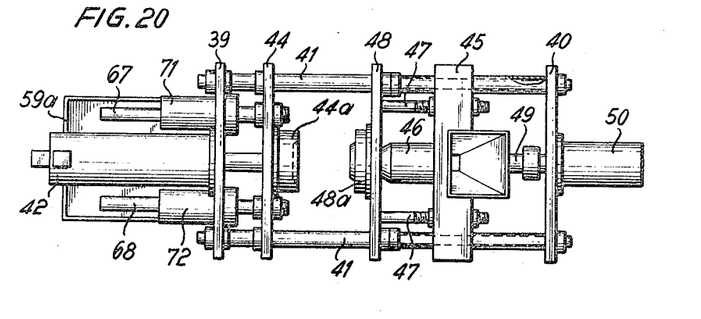
FIG. 20 is a top plan view of the machine shown in FIG. 20.

FIGS. 19 and 20 illustrate a third injection molding machine which comprises a frame including two upright supports 39 and 40 connected by parallel horizontal tie rods 41. Two platens 44, 48 are mounted on the tie rods 41, and the platen 44 is connected with the differential piston 43 of a mold closing unit which further comprises a fixed double-acting cylinder 42. The platens 44, 48 respectively carry mold sections 44a, 48a and the platen 44 is movable along the tie rods 41.

The shooting cylinder 46 is mounted on a crosshead 45 which is fixedly secured to the tie rods 41. Distancing bars 47 connect the platen 48 to the crosshead 45 so that this platen is fixedly supported by the frame of the injection molding machine. It is also possible to mount the platen 48 with limited freedom of movement along the tie rods 41 to facilitate separation of the injection nozzle on the shooting cylinder 46.

The ram 49 is reciprocable with reference to the shooting cylinder 46 and is fixed to a differential piston 51 which is slidable in a double-acting cylinder 50 secured to the support 40.

The ram 49 carries a holder 52 for an adjustable trip 53 which can actuate a stationary electric switch 54. The switch 54 can start a timer 55 which controls a multi-way valve 57 through a solenoid 56. The valve 57 is installed in the feed conduits 60, 61 connected with the pressure outlet of a pump 59 driven by an electric motor 58. The feed conduits 60, 61 are connected with the chambers of the double-acting cylinder 42 and with branch conduits 62, 63 which are connected with the chambers of the double-acting cylinder 50. The branch conduit 62 accommodates an adjustable throttle 62′ which throttles the flow of oil in one direction but allows unimpeded flow of oil in the other direction.

The cylinder 42 carries a pressure-responsive valve 163 and a two-way valve 64 controlled by solenoids 65 and 66.

The clamping unit of the injection molding machine shown in FIGS. 19 and 20 comprises male components or posts 67, 68 which are mounted on the platen 44 and female components or gripping devices 71, 72 mounted on the support 39.

The valve 64 is connected with supply conduits 69, 70 for the gripping devices 71, 72 and can permit or prevent the flow of oil between such supply conduits and the left-hand chamber of the cylinder 42. The platen 44 carries a trip 73 which actuates a fixed limit switch 74 when the mold is open, i.e., when the section 44a has been moved to a position at a maximum distance from the section 48a.

The operation of the injection molding machine shown in FIGS. 19 and 20 is as follows:

In the illustrated position of the movable platen 44, the pump 59 forces oil (or another suitable pressure medium) through the valve 57 and feed conduit 60 into the left-hand chamber of the cylinder 42. Such oil exerts pressure against the large left-hand end face of the differential piston 43 so that the latter moves in a direction away from the valve 64 and pushes the platen 44 and posts 67, 68 toward the platen 48. When the mold sections 44a, 48a abut against each other, the pressure of oil in the supply conduit 60 and in the left-hand chamber of the cylinder 42 rises whereby the throttle 62′ in the branch conduit 62 responds to a predetermined rise in pressure and admits oil into the right-hand chamber of the cylinder 50 to displace the piston 51 and ram 49 in a direction to the left so that the ram 49 penetrates deeper into the shooting cylinder 46. The ram 49 then causes the nozzle of the cylinder 46 to bear against the fixed platen 48 and to register with the cavity defined by the abutting mold sections 44a, 48a.

As the ram 49 begins to move with the piston 51 in response to admission of oil through the branch conduit 62, its holder 52 moves the trip 53 into engagement with the switch 54. This switch starts the timer 55 and energizes the solenoid 66 which opens the valve 64. Thus, oil can flow from the cylinder 42, through the supply conduits 69, 70 and into the gripping devices 71, 72. The pressure of oil rises during injection of plasticized material through the nozzle of the shooting cylinder 46, and such pressure rises to a maximum value when the mold cavity has been filled with plasticized material. The clamping action of the unit which includes the parts 67, 68, 71, 72 is proportional with such pressure so that the gripping devices 71, 72 move the posts 67, 68 in a direction to the right and offer a requisite resistance to separation of the mold sections 44a, 48a. The reasons for relative movement between the posts 67, 68 and the gripping devices 71, 72 will be explained in connection with FIGS. 5–9.

The pump 59 is provided with a regulator which reduces its output in response to increasing oil pressure so that such pressure continues to exist. At a certain pressure, the pressure-responsive switch 163 energizes the solenoid 65 and deenergizes the solenoid 66 so that the valve 64 closes and the oil pressure in the supply conduits 69, 70 and gripping devices 71, 72 remains unchanged.

The timer 55 deenergizes the solenoid 56 after a preselected interval of time so that the position of the multi-way valve 57 changes in response to spring pressure whereby the valve 57 reverses the direction of oil flow in the feed conduits 60, 61. The branch conduit 63 of the conduit 61 admits oil into the left-hand chamber of the cylinder 50 so that the piston 51 retracts the ram 49. Such oil exerts pressure against the smaller left-hand end face of the piston 51. Shortly before the ram 49 reassumes its fully retracted position, the trip 53 on the holder 52 actuates the valve 54 again whereby this valve energizes the solenoid 66 to open the valve 64 which then permits flow of oil from the supply conduits 69, 70 back into the cylinder 42 and via feed conduit 60 back into the pump 59 or into the oil tank 59a. Once the pressure in the gripping devices 71, 72 is relaxed, these devices are disengaged from the respective posts 67, 68. Oil admitted through the feed conduit 61 and acting against the smaller right-hand end face of the piston 43 is then free to open the mold by causing the piston 43 to move the platen 44 and the mold section 44a away from the platen 48 and mold section 48a. Shortly before the platen 44 reassumes its leftmost position, the trip 73 actuates the switch 74 which energizes the solenoids 56 and 65. The solenoid 56 adjusts the valve 57 so that the direction of oil flow is reversed again, and the solenoid 65 closes the valve 64. The next working cycle can begin and is carried out in the same way as described above.

It is to be noted that the platen 44 and/or 48 normally carries suitable knockout pins (not shown) or analogous ejecting devices which can expel a freshly molded article from its cavity while the platen 44 moves away from the platen 48. If the knockout pins are mounted on the platen 44, they can be made to strike against the support 39 and to thus effect expulsion of the finished article.

The gripping devices 71, 72 do not draw or pull the platens 44, 48 against each other. These devices push the platen 44 (through the intermediary of the posts 67, 68) in a direction toward the platen 48.

A very important advantage of the machine shown in FIGS. 19 and 20 is that a single hydraulic operating assembly can supply pressure medium to the closing unit 42–43, to the cylinder 50 for the ram 49, and preferably also to the gripping devices 71, 72. The aforedescribed system of valves allows for accurate programming of the injection molding operation.

Since the closing unit 42, 43 must shift a single platen (44), the piston 43 can be made to perform its mold closing and opening strokes at a very high speed to reduce the length of intervals between successive injection molding operations. The inertia of parts which are displaced by the piston 43 is rather small.

Figure 5:
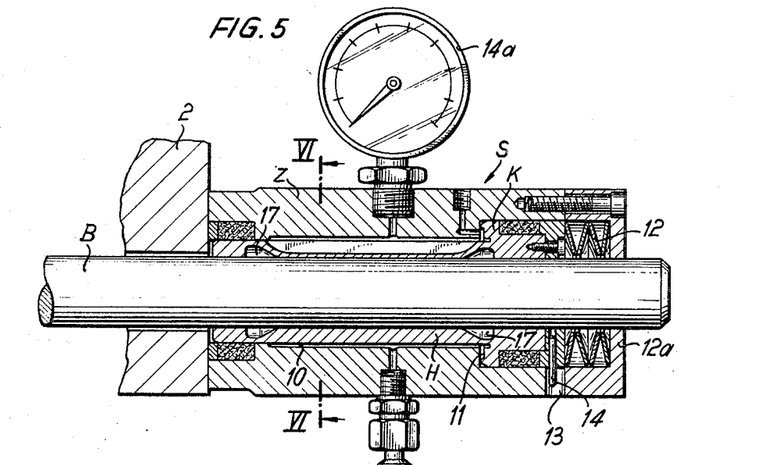
FIG. 5 is an enlarged axial section through a clamping unit which may be utilized in the machine of FIGS. 1-2 or FIGS. 3-4.
Figure 6:
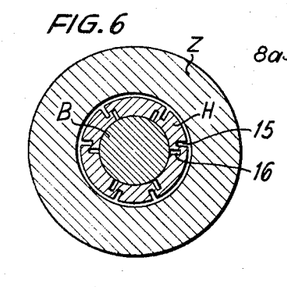
FIG. 6 is a transverse section as seen in the direction of arrows from the line VI—VI of FIG. 5.

FIGS. 5 and 6 illustrate a first embodiment of a hydraulically operated female component or gripping device S which may be used in the injection molding machine of FIGS. 1–2 or 3–4 as well as in the machine of FIGS. 19–20 wherein the gripping devices have been denoted by numerals 71 and 72. This gripping device S comprises a rigid cylinder element or shell Z which is bolted or otherwise affixed to the platen 2. The shell Z accomodates a tubular coupling sleeve H which is slidable on the male component or post B when the supply conduit 8a does not admit a liquid pressure medium. The post B is affixed to the other platen 1 in a manner as shown in FIGS. 1 and 2. The coupling sleeve H is movable axially in the shell Z and one of its end portions forms an annular piston element K which defines with an internal shoulder of the shell an annular pressure chamber 11 communicating with a cylindrical second chamber 10 which surrounds the coupling sleeve H and is connected with the supply conduit 8a. As clearly shown in FIG. 5, oil admitted into the annular pressure chamber 11 will cause the coupling sleeve H to move in a direction to the right so that the post B is drawn in the same direction and pulls or draws the platen 1 toward the platen 2. This is due to the fact that pressurized oil admitted to the cylindrical second chamber 10 causes the coupling sleeve H to contract and to adhere to the post B. An internal compartment of the shell Z accommodates a package of dished springs 12 disposed between an end wall 12a of the shell and the piston element K. The springs 12 urge the piston element K against the adjoining shoulder of the shell Z, i.e., these springs tend to expel oil from the annular pressure chamber 11 and to move the platen 2 away from the platen 1 or vice versa. The springs 12 are inserted in prestressed condition so that oil admitted by the supply conduit 8a first fills the cylindrical second chamber 10 and causes radial contraction of the coupling sleeve H into strong frictional engagement with the post B. When the pressure of oil continues to rise, the volume of the annular pressure chamber 11 increases against the opposition of springs 12 so that the shell Z is shifted axially with reference to the coupling sleeve H, or vice versa, to draw the platens 1 and 2 nearer to each other and to retain the platens against movement away from each other when the ram 7 injects plasticized material into the cavity defined by the mold sections 1a and 2a. When the pressure of oil in the chambers 10, 11 decreases, the springs 12 expand in the first step and move the platens 1, 2 slightly apart. In response to further reduction in oil pressure, frictional engagement between the post B and coupling sleeve H is terminated or reduced sufficiently to allow for opening of the mold by the pusher bar 3. The coupling sleeve H is preferably constructed in such a way that it normally tends to expand and to move its internal surface away from the peripheral surface of the post B. Such radial deformability of the coupling sleeve H is enhanced by the provision of axially parallel equidistant channels 15, 16 (see FIG. 6) which are respectively machined into the external and internal surfaces of the sleeve. Each outer channel 15 preferably overlaps a portion of the adjoining internal channel 16 to form therewith a relatively thin flexible web which facilitates expansion and contraction of the coupling sleeve H. Annular grooves 17 machined into the internal surface of the coupling sleeve H at the longitudinal ends of the channels 15, 16 also contribute to greater flexibility of this sleeve.

Axial movements of the coupling sleeve H and shell Z with reference to each other are by a radial pin 14 which is fixed to the piston element K and extends into a cutout 13 of the shell. By observing the position of the pin 14, the persons in charge will know the exact position of the coupling sleeve H and its piston element K. A pressure gauge 14a serves to indicate the pressures which are set up in the chambers 10 and 11.

A very important advantage of the clamping unit shown in FIGS. 5 and 6 is that the admission of hydraulic pressure medium at a single point (conduit 8a) suffices to furnish the necessary locking force (in response to engagement of the coupling sleeve H with the post B) and also the necessary sealing force as well as a further reduction in the distance between the platens 1, 2 (in response to admission of oil into the chamber 11). In other words, the hydraulic pressure medium furnishes a locking and a sealing pressure whereby the latter pressure develops as soon as the locking step is completed.

The springs 12 insure that the application of sealing pressure follows automatically the locking of sleeve H to the post B whereby the application of such sealing pressure is carried out without necessitating the provision of special valves or other fluid flow controlling parts. Thus, the construction of the gripping device S is very simple and, therefore, such device is not prone to malfunction and can withstand exceptionally large stresses. The operation of the gripping device S shown in FIGS. 5 and 6 is as follows:

When the pusher bar 3 of FIGS. 1 and 2 has closed the mold by moving the mold sections 1a, 2a into actual abutment with each other, and when the motion transmitting member 9 bears against the pressurizing plunger 8 on the frame F, the supply conduits 8a force oil into the cylindrical second chambers 10 of the respective gripping devices S. With reference to FIGS. 5 and 6, oil which enters the second chamber 10 causes the median portion of the coupling sleeve H to contract and to bear strongly against the peripheral surface of the post B. In other words, the post B and the coupling sleeve H now form a unit whose components cannot move with reference to each other unless and until the pressure of oil in the second chamber 10 decreases. This is tantamount to a hydraulic locking or clamping action because the platens 1 and 2 are then held against movement away from each other. The pressure of oil in the second chamber 10 continues to rise in response to further displacement of the pusher bar 3 in a direction toward the ram 7 so that the oil is compelled to penetrate into the pressure chamber 11 and to bring about compression of springs 12. The piston element K moves toward the end wall 12a, or vice versa, whereby the distance between the platens 1 and 2 decreases still further and the platens cannot move apart as long as the pressure in the pressure chamber 11 suffices to prevent for expansion of the springs 12 and to overcome the opening pressures which develop when the ram 7 injects plasticized material into the mold cavity.

When the injecting step is completed, pressure of oil in the chambers 10, 11 (which are in direct communication with each other) decreases whereby the springs 12 expand in the first step and reduce the volume of the pressure chamber 11. In the next step, the coupling sleeve H is allowed to expand radially and to be disengaged from the post B so that the latter is free to follow the movement of pusher bar 3 when this bar is caused to move away from the ram 7 and to separate the mold sections 1a, 2a from each other in order to allow for ejection of the freshly molded article.

It is clear that the arrangement shown in FIGS. 5 and 6 can be modified in a number of ways without departing from the spirit of the present invention. For example, the mounting of posts B and gripping devices S can be reversed, and the posts B can be omitted altogether if the gripping devices S are mounted on the platen 1 and/or 2 and are slidable directly on the tie rods 1A. Also, one or more gripping devices S can be mounted on each of the platens 1 and 2, and each such gripping device can cooperate directly with one of the tie rods 1A or with separate posts corresponding to the posts B.

Figure 7:
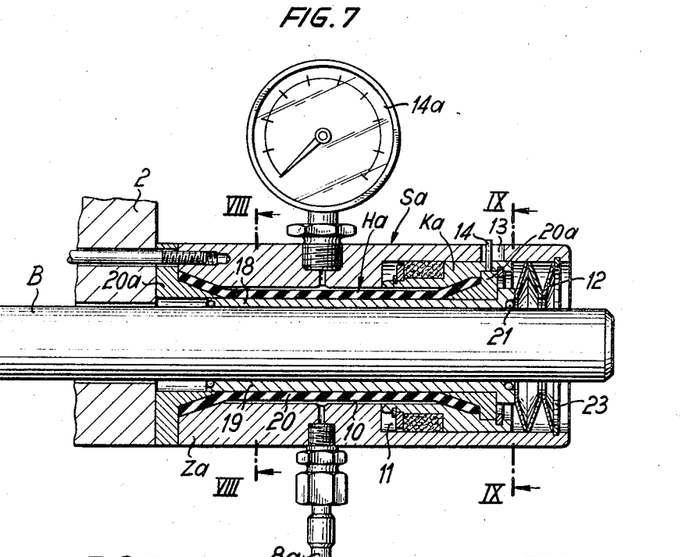
FIG. 7 is an axial section through a second clamping unit.
Figure 8:
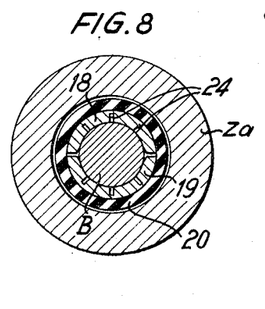
FIG. 8 is a transverse section as seen in the direction of arrows from the line VIII—VIII of FIG. 7.
Figure 9:
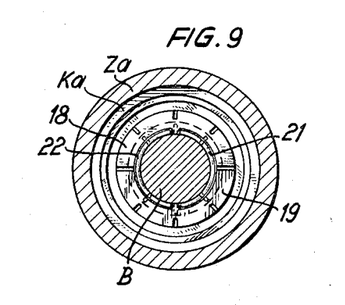
FIG. 9 is a transverse section as seen in the direction of arrows from the line IX—IX of FIG. 7.

FIGS. 7 to 9 illustrate a second gripping device Sa which can cooperate with a post B substantially in the same way as described in connection with FIGS. 5 and 6. This gripping device Sa utilizes a composite coupling sleeve Ha which comprises a tubular diaphragm 20 of rubber or other suitable elastomeric material disposed around a two-piece inner sleeve or gripper having two mirror symmetrical semicylindrical portions 18 and 19. The cylinder element or shell Za is attached to the platen 2 and accommodates the diaphragm 20 to define therewith a second chamber 10 which communicates with the annular pressure chamber 11 at the left-hand side of an annular piston element Ka which also forms part of the coupling sleeve Ha and surrounds the adjoining end portion of the diaphragm 20. Pairs of springs 21, 22 are accommodated in suitably configurated internal grooves of the portions 18, 19 and tend to move such portions apart, i.e., away from the peripheral surface of the post B. The package of dished springs 12 is inserted between a retaining ring 23 in the shell Za and the piston element Ka to urge the latter in a direction to reduce the volume of the pressure chamber 11. The pin 14 in the cutout 13 serves the purposes which were described in connection with FIGS. 5 and 6.

The ends of the diaphragm 20 are clamped between the shell Za and piston element Ka on the one hand, and suitable wedge-like inserts 20a on the other hand. Axially parallel channels 24 in the internal surfaces of the portions 18, 19 enhance their flexibility and insure more reliable gripping action between the coupling sleeve Ha and the post B.

The operation of the gripping device Sa is analogous to the operation of the aforedescribed gripping device S. The diaphrgam 20 is compressed in the first step to maintain the semicylindrical portions 18, 19 in strong frictional engagement with the post B, and the volume of the pressure chamber 11 increases in the second step to bring about axial displacement between the post B and coupling sleeve Ha on the one hand, and the shell Za on the other hand.

It is clear that the inner shell may comprise three or more trough-shaped portions or that the portions 18, 19 may be replaced by a one-piece inner shell. These portions 18, 19 can be readily removed and replaced by fresh portions. The same holds true for the diaphragm 20. The portions 18, 19 need not be too rigid or too heavy because the application of hydraulic pressure against the peripheral surface of the diaphragm 20 insures the generation of satisfactory locking pressures. Also, and since the portions 18, 19 need not be too heavy and/or too rigid, the springs 21, 22 must exert a small force in order to move the portions 18, 19 away from the post B.

Figure 10:
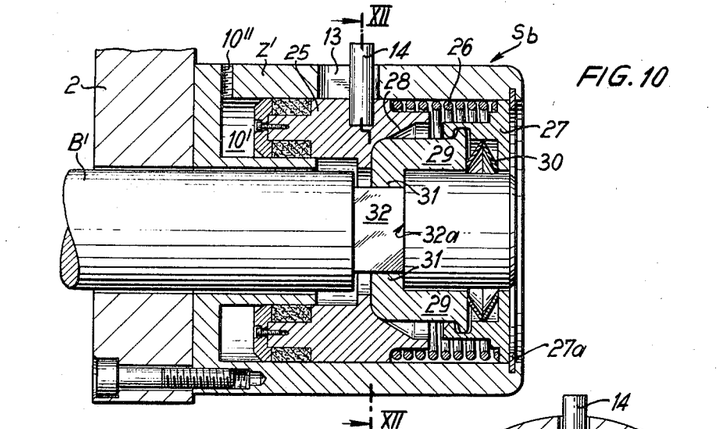
FIG. 10 is an axial section through a third clamping unit which is shown in operative position.
Figures 11, 12:
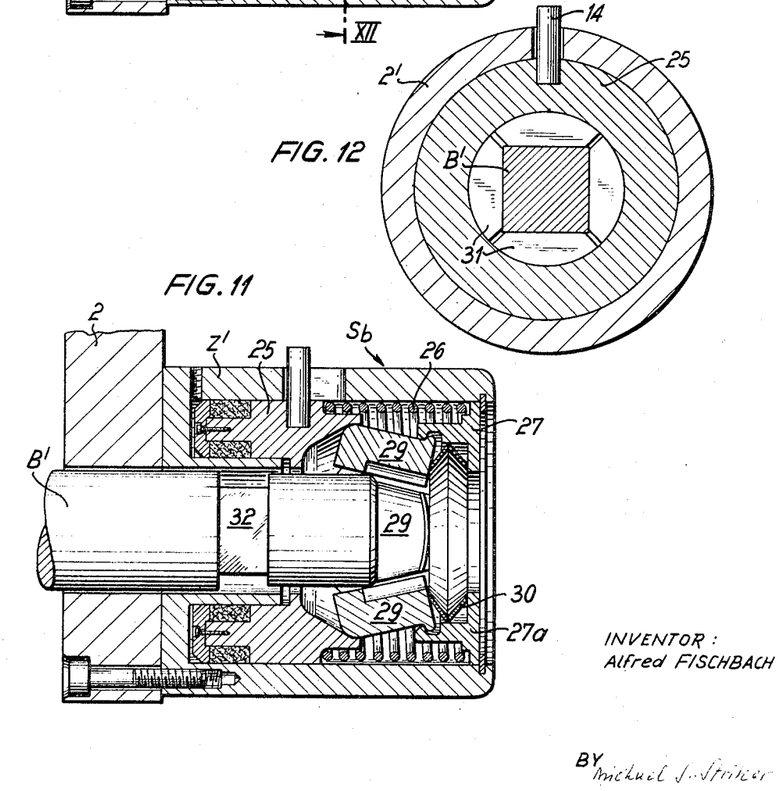
FIG. 11 illustrates the clamping unit of FIG. 10 in idle position.
FIG. 12 is a transverse section as seen in the direction of arrows from the line XII—XII of FIG. 10.

FIGS. 10 to 12 illustrate the components of a further clamping unit where in certain parts of a gripping device Sb are movable into positive mechanical engagement with a portion of a modified post B'. The gripping device Sb comprises a cylinder element or shell Z' which accommodates an annular piston element 25 surrounding the post B' and defining with the shell Z' an annular pressure chamber 10' adapted to receive oil through a port 10" connected with a supply conduit 8a, j, 69 or 70 (not shown). The shell Z' is attached to the platen 2 and the post B' is affixed to the platen 1, not shown in FIGS. 10 to 12. A strong helical spring 26 operates between a annular retainer or carrier 27 and the piston element 25 and urges the latter in a direction to the left and to the position shown in FIG. 11. The retainer 27 is held in the shell Z' by a ring 27a.

The piston element 25 is formed with a conical internal cam face 28 which diverges toward the retainer 27 and cooperates with a coupling including four followers 29 which are rockably coupled to the retainer and have claws 31 adapted to enter a circumferential groove 32 of the post B' and to thus establish a positive mechanical connection between the post and the gripping device Sb. A package of dished springs 30 accommodated in the retainer 27 tends to rock the followers 29 in a sense to move their claws 31 radially and away from the post B' and also to maintain these followers in abutment with the cam face 28. Such idle positions of the followers 29 are shown in FIG. 11.

When the port 10" admits pressurized oil into the chamber 10', the piston element 25 overcomes the resistance of the spring 26 and moves from the position of FIG. 11 toward the position of FIG. 10 whereby the cam face 28 rocks the followers 29 in a sense to move their claws 31 into the recess 32 wherein the claws engage an annular shoulder 33a of the post B' and prevent movement of the platens 1 and 2 away from each other.[1] The springs 30 store energy and can move the claws 31 away from the shoulder 32a in response to a sufficient reduction in oil pressure and resultant axial movement of the piston element 25. Movement of the piston element 25 back to the position of FIG. 11 is effected by the expanding spring 26 and is assisted by suction in the chamber 10' when the pump evacuates oil from the shell Z'.

The pin 14 in the cutout 13 enables the operator to determine the axial position of the piston element 25.

The pressure chamber 10' will receive oil subsequent to movement of the post B' from the position of FIG. 11 to the position of FIG. 10 in response to closing of the mold.

Figure 13:
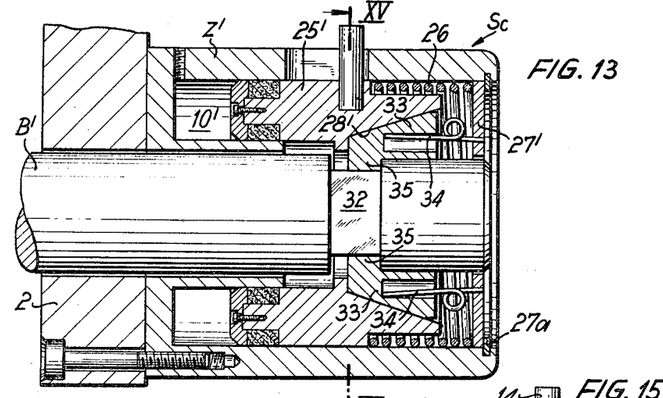
FIG. 13 is an axial section through a fourth clamping unit which is shown in operative position.
Figure 14:
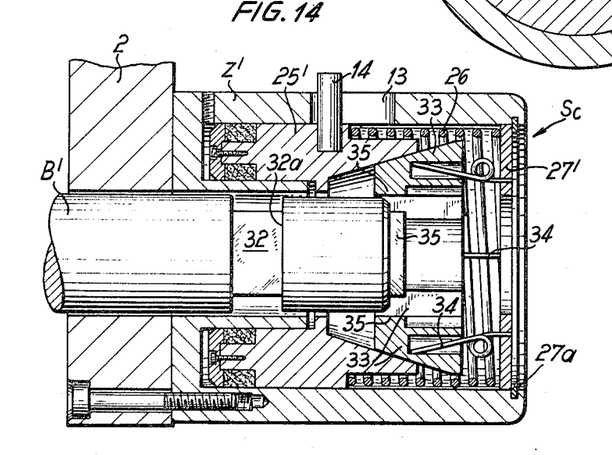
FIG. 14 illustrates the clamping unit of FIG. 13 in idle position.
Figure 15:
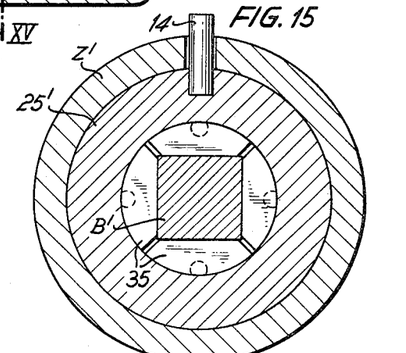
FIG. 15 is a transverse section as seen in the direction of arrows from the line XV—XV of FIG. 13.

In FIGS. 13 to 15, the piston element 25' in the cylinder element or shell Z' of a gripping device Sc has a somewhat different cam face 28' which cooperates with a coupling including four radially movable followers 33 having claws 35 engageable with the shoulder 32a in the groove 32 of the post B'. The followers 33 resemble the jaws of a chuck. The retainer 27 of FIGS. 10–12 is replaced by a disk-shaped retainer 27' and carries four torsion springs 34 tending to move the followers 33 radially outwardly and to maintain the conical outer faces of these followers in abutment with the cooperating cam face 28'. When the chamber 10' receives oil, the piston element 25' moves axially away from the position of FIG. 14 toward the position of FIG. 13 and the claws 35 of the followers 33 are moved radially inwardly into clamping and locking engagement with the shoulder 32a.

Figures 16, 17, 18:
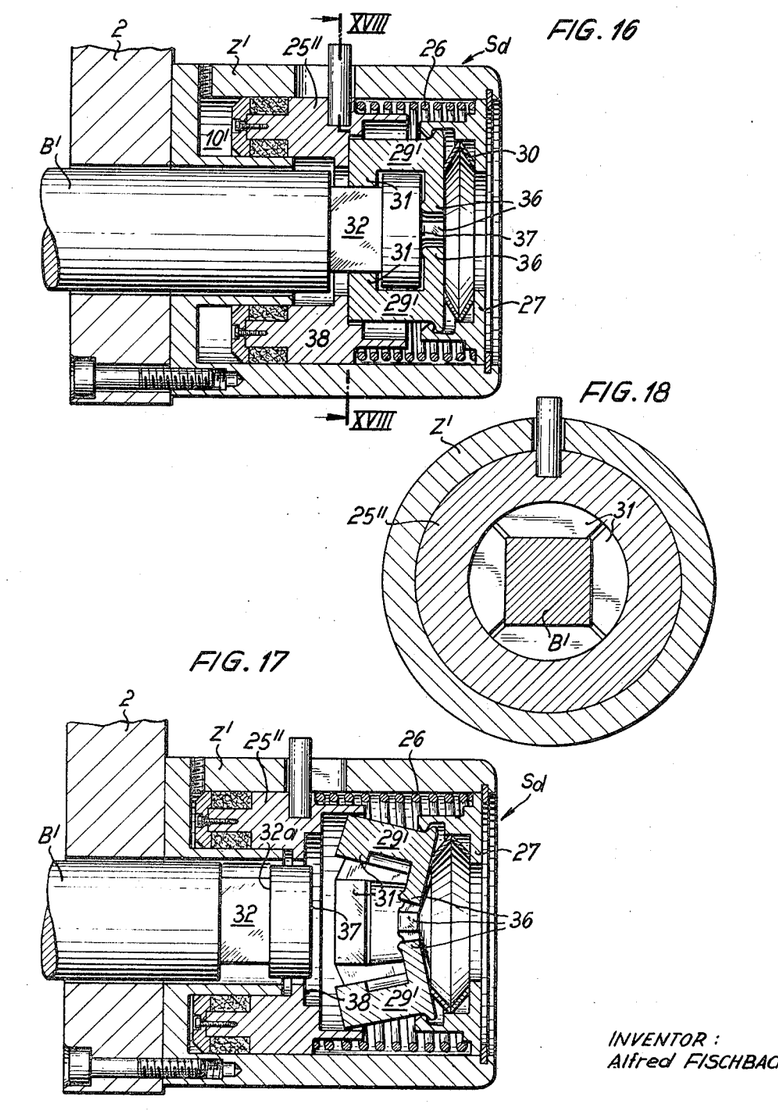
FIG. 16 is an axial section through a further clamping unit which is shown in operative position.
FIG. 17 illustrates the clamping unit of FIG. 16 in idle position.
FIG. 18 is a transverse section as seen in the direction of arrows from the line XVIII—XVIIII of FIG. 16.

Referring finally to FIGS. 16 to 18, there is shown a clamping unit including a post B' and a gripping device Sd which latter resembles the gripping device Sb of FIGS. 10 to 12. The followers 29 together form a coupling and are provided with motion transmitting arms 36 which extend into the path of the front end face 37 on the post B'. These followers 29' are biased by springs 30 which tend to move the claws 31 radially outwardly and away from the groove 32 in the post B'. The piston element 25" of the gripping device Sd has an annular shoulder 38 which abuts against the adjoining end faces of the followers 29' when the claws 31 extend into the groove 32 (see FIG. 16).

In this embodiment of the improved clamping unit, the claws 31 can engage with the post B' without necessitating admission of oil into the chamber 10'. Thus, when the closing unit (for example, the closing unit D, E of FIGS. 3 and 4) moves the mold sections 1a, 2a into abutment with each other, the post B' will move from the position of FIG. 17 to the position of FIG. 16 and its end face 37 will rock the followers 29' until the claws 31 engage the square neck portion (see FIG. 18) surrounded by the groove 32. In response to subsequent admission of oil into the chamber 10', the piston element 25" compresses the

---

[1] When the pressure of the oil continues to rise, the platens 1 and 2 are drawn nearer to each other in order to furnish the necessary seating force, as described in connection with FIGS. 5 to 9.

spring 26 and its shoulder 38 bears against the followers 29' to prevent withdrawal of claws 31 from the groove 32. The claws 31 are moved against the shoulder 32a and draw the post B' deeper into the shell Z' to move the platens 1 and 2 nearer to each other.

At least in some instances, especially in the embodiments shown in FIGS. 5–6 and 7–9, the peripheral surfaces of the posts B are preferably roughened to improve the frictional engagement between the posts and the respective gripping devices. Alternatively such surfaces of the posts and/or gripping devices which come in actual engagement with each other may be provided with layers or coats of friction-generating material.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In an injection molding machine, particularly for molding of articles consisting of plastic material, a frame; a pair of platens supported by said frame and each comprising a mold section, at least one of said platens being movable toward and away from the other platen to respectively close and open the mold which includes said sections; closing means arranged to move said one platen with reference to the other platen to respectively open and close said mold; and at least one hydraulically operated clamping unit for applying to said platens a sealing pressure when the mold is closed, said clamping unit including a first component carried by said one platen and a second component cooperating with said first component and at least indirectly connected with said other platen, one of said components being constituted by a post and the other component comprises a cylinder element, a piston element surrounding said post and reciprocably received in said cylinder element defining therewith a pressure chamber and movable coupling means moved into and held in engagement with said post upon feeding of pressure fluid into said pressure chamber so as to connect one of said elements to said post and for subsequently effecting relative movement between said one component and the other of said elements in a direction to move said platens nearer to each other upon further feeding of pressure fluid into said pressure chamber.

2. A structure as set forth in claim 1, wherein said second component is directly affixed to said other platen and wherein said components are arranged to draw the platens toward each other.

3. A structure as set forth in claim 2, and further comprising pressurizing means operated by said closing means for forcing pressure fluid into said chamber.

4. A structure as set forth in claim 3, wherein said pressurizing means comprises a plunger mounted on said frame and said closing means comprises motion transmitting means for engaging and displacing said plunger in response to movement of said one platen toward the other platen.

5. A structure as set forth in claim 1, further comprising a source of hydraulic fluid, pump means for pressurizing such fluid, and conduit means connecting said pump means with said clamping unit.

6. A structure as set forth in claim 5, wherein said closing means comprises a hydraulic cylinder and piston unit and wherein said pump means is arranged to also supply pressurized fluid to said cylinder and piston unit.

7. A structure as set forth in claim 1, wherein said coupling means comprises a radially contractible sleeve surrounding said post, said sleeve being connected with said piston element and having a peripheral surface defining with said cylinder element a second chamber communicating with said pressure chamber, and further comprising means for introducing into said second chamber a hydraulic fluid to thereby contract said sleeve into strong frictional engagement with said post so that fluid thereupon admitted into said pressure chamber brings about relative axial movement between said cylinder element and said sleeve.

8. A structure as set forth in claim 7, wherein said other component further comprises resilient means for opposing relative axial movement between said sleeve and said cylinder element in response to admission of fluid into said pressure chamber.

9. A structure as set forth in claim 8, wherein said resilient means comprises at least one spring operating between said elements.

10. A structure as set forth in claim 7, wherein the means for introducing hydraulic fluid into said chambers comprises a cylinder member and a differential piston reciprocable in said cylinder member.

11. A structure as set forth in claim 1, wherein said coupling means comprises an inner sleeve surrounding said post and comprising a plurality of portions movable radially with reference to the post in the interior of said cylinder element, a tubular diaphragm of elastomeric material surrounding said inner sleeve and having a peripheral surface defining with said cylinder element a second chamber communicating with said pressure chamber, and means securing said inner sleeve and said diaphragm to said piston element for movement therewith in the axial direction of said cylinder element, and further comprising means for introducing into said chambers a hydraulic fluid whereby the fluid admitted into said second chamber compresses the diaphragm to move said inner sleeve into frictional engagement with said post so that any axial movement between said elements in response to entry of fluid into said pressure chamber results in axial displacement between said cylinder element and said post.

12. A structure as set forth in claim 1, wherein said coupling means include at least one follower movable by said piston element into mechanical engagement with said post when said mold is closed, and further comprising means for admitting into said pressure chamber a hydraulic fluid and for thereby shifting said piston element in axial direction to move said follower into engagement with said post.

13. A structure as set forth in claim 12, wherein said post is provided with a shoulder and said follower is rockable in said cylinder element and comprises a claw which engages said shoulder in response to rocking of the follower by said piston element on admission of fluid into said pressure chamber.

14. A structure as set forth in claim 12, wherein said follower is movable radially in said cylinder element and comprises a conical cam face cooperating with a conical cam face provided on said piston, said follower further comprising a claw and said post having a shoulder which is engaged by said claw in response to radial movement of the follower on admission of fluid into said pressure chamber.

15. A structure as set forth in claim 1, wherein said post has a shoulder and said coupling means including at least one follower mounted in said cylinder element and having a claw engageable with said shoulder, said follower being rockable by said post in response to closing of said mold to thereby move said claw into engagement with said shoulder, and further comprising means for admitting into said chamber a hydraulic fluid to move said piston element with reference to said cylinder element into engagement with said follower and to maintain said claw in engagement with said shoulder.

16. A structure as set forth in claim 1, wherein said frame comprises tie rods slidably supporting said one platen and wherein one of said tie rods constitutes one component of said clamping unit.

17. A structure as set forth in claim 1, wherein said other platen and said second component are fixed to said frame and wherein said components are arranged to push said one platen toward said other platen.

18. A structure as set forth in claim 17, further comprising a shooting cylinder carried by said frame and having an injection nozzle sealingly engaging the mold section of said other platen, a ram for injecting a plasticized charge from said shooting cylinder into the mold when the latter is closed and sealed by said units, and common hydraulic operating means for said closing unit and said ram.

19. A structure as set forth in claim 18, wherein said hydraulic operating means includes conduit means connecting said closing unit with said clamping unit and valve means for controlling the flow of hydraulic fluid between said units.

References Cited

UNITED STATES PATENTS

| | | | |
|---|---|---|---|
| 2,916,768 | 12/1959 | Quere et al. | 18—30 |
| 2,976,569 | 3/1961 | Quere et al. | 18—30 |
| 3,183,555 | 5/1965 | Siegel | 18—30 |
| 3,199,159 | 8/1965 | Wernecke | 18—30 X |

WILBUR L. McBAY, *Primary Examiner.*

U.S. Cl. X.R.

18—16; 164—341